US012804750B2

(12) United States Patent
Fujimori

(10) Patent No.: US 12,804,750 B2
(45) Date of Patent: Nov. 17, 2026

(54) COMMUNICATION DEVICE, COMMUNICATION METHOD, AND NON-TRANSITORY COMPUTER-READABLE STORAGE MEDIUM FOR WIRELESS COMMUNICATION WITH ANOTHER WIRELESS DEVICE UTILIZING A TRAFFICE IDENTIFIER (TID)

(71) Applicant: CANON KABUSHIKI KAISHA, Tokyo (JP)

(72) Inventor: Yuki Fujimori, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 18/603,000

(22) Filed: Mar. 12, 2024

(65) Prior Publication Data

US 2024/0224361 A1 Jul. 4, 2024

Related U.S. Application Data

(63) Continuation of application No. PCT/JP2022/033060, filed on Sep. 2, 2022.

(30) Foreign Application Priority Data

Sep. 13, 2021 (JP) ................................. 2021-148822

(51) Int. Cl.
*H04W 76/11* (2018.01)
*H04L 5/00* (2006.01)
(Continued)

(52) U.S. Cl.
CPC ........... *H04W 76/15* (2018.02); *H04L 5/0048* (2013.01); *H04W 72/56* (2023.01)

(58) Field of Classification Search
CPC ... H04W 72/56; H04W 72/566; H04W 76/11; H04W 76/15; H04W 84/12
(Continued)

(56) References Cited

U.S. PATENT DOCUMENTS 11,602,002 B2 * 3/2023 Chu ...................... H04W 76/11
11,924,823 B2 * 3/2024 Kwon ............... H04W 72/0446
(Continued)

FOREIGN PATENT DOCUMENTS

JP 2018050133 A 3/2018
WO 2021246250 A1 12/2021

OTHER PUBLICATIONS

Guogang Huang, et al. (Huawei); "Discussion on Multi-link Setup"; IEEE 802.11-20/1534r8; Sep. 2020; <URL: https://mentor.ieee.org/802.11/dcn/20/11-20-1534-08-00be-discussion-on-multi-link-setup.pptx>; pp. 1-15.
(Continued)

*Primary Examiner* — John Pezzlo
(74) *Attorney, Agent, or Firm* — Canon U.S.A., Inc. IP Division

(57) ABSTRACT

In a communication device capable of establishing a plurality of links in parallel with another communication device, a request for a TID (Traffic identifier) and link assignment, the TID indicating a priority of data, is received, and a response to the received request is transmitted. At this time, in a case where a first request is accepted and a second request is unaccepted among received requests, a response indicating that the first request is accepted and the second request is unaccepted is transmitted.

15 Claims, 12 Drawing Sheets

(51) Int. Cl.
*H04W 72/56* (2023.01)
*H04W 76/15* (2018.01)
*H04W 84/12* (2009.01)

(58) Field of Classification Search
USPC .......................... 370/252, 278, 329, 430, 338
See application file for complete search history.

(56) References Cited

U.S. PATENT DOCUMENTS

| | | | | |
|---|---|---|---|---|
| 2021/0144579 | A1* | 5/2021 | Ke | H04W 76/12 |
| 2021/0212150 | A1 | 7/2021 | Chu | |
| 2023/0109874 | A1* | 4/2023 | Gan | H04L 27/2602<br>370/329 |
| 2023/0276516 | A1* | 8/2023 | Shirakawa | H04L 5/14<br>370/329 |
| 2023/0403598 | A1* | 12/2023 | Lu | H04W 8/24 |
| 2024/0163948 | A1* | 5/2024 | Kim | H04W 76/15 |
| 2024/0306224 | A1* | 9/2024 | Baek | H04W 28/0263 |

OTHER PUBLICATIONS

Yongho Seok et al., Proposed Draft Text for MLO TID-to-link Mapping, doc.:IEEE 802.11-21/0019r10, Apr. 14, 2021, pp. 1-11.
Anonymous, 9. Frame formats, 9.2. MAC frame formats, 9.2.4. Frame fields, 9.2.4.1 Frame Control field, 9.2.4.1.8 More Data subfield, IEEE P802.11be/D1.1, Jul. 2021, pp. 81-186.

* cited by examiner

FIG. 13A

| Status code | Name | Meaning |
|---|---|---|
| 0 | SUCCESS | Successful. |
| 1 | REFUSED, REFUSED_REASON_UNSPECIFIED | Unspecified failure. |
| 2 | TDLS_REJECTED_ALTERNATIVE_PROVIDED | TDLS wakeup schedule rejected but alternative schedule provided. |
| 3 | TDLS_REJECTED | TDLS wakeup schedule rejected. |
| 4 | | Reserved. |
| 5 | SECURITY_DISABLED | Security disabled. |
| 6 | UNACCEPTABLE_LIFETIME | Unacceptable lifetime. |
| 7 | NOT_IN_SAME_BSS | Not in same BSS. |
| 8-9 | | Reserved. |
| 10 | REFUSED_CAPABILITIES_MISMATCH | Cannot support all requested capabilities in the Capability Information field. |
| 11 | DENIED_NO_ASSOCIATION_EXISTS | Reassociation denied due to inability to confirm that association exists. |
| 12 | DENIED_OTHER_REASON | Association denied due to reason outside the scope of this standard. |
| 13 | UNSUPPORTED_AUTH_ALGORITHM | Responding STA does not support the specified authentication algorithm. |
| 14 | TRANSACTION_SEQUENCE_ERROR | Received an Authentication frame with authentication transaction sequence number out of expected sequence. |
| 15 | CHALLENGE_FAILURE | Authentication rejected because of challenge failure. |
| 16 | REJECTED_SEQUENCE_TIMEOUT | Authentication rejected due to timeout waiting for next frame in sequence. |
| 17 | DENIED_NO_MORE_STAS | Association denied because AP is unable to handle additional associated STAs. |

FIG. 13B

| Status code | Name | Meaning |
|---|---|---|
| 18 | DENIED_STA_AFFILIATED_WITH_MLD_WITH_EXISTING_MLD_ASSOCIATION | Association denied because the requesting STA is affiliated with a non-AP MLD that is associated with the AP MLD. |
| 19 | NSEP_DENIED_UNAUTHORIZED | NSEP priority access denied because the non-AP MLD or non-AP EHT STA is not authorized to use the service. |
| 20 | NSEP_DENIED_OTHER_REASON | NSEP priority access denied due to reason outside the scope of this standard. |
| 21 | DENIED_TID_TO_LINK_MAPPING | Request denied because the requested TID-to-link mapping is unacceptable. |
| 22 | PREFERRED_TID_TO_LINK_MAPPING_SUGGESTED | Preferred TID-to-link mapping suggested. |
| 23 | ACCEPT_PARTIAL_TID_TO_LINK_MAPPING | A part of request accepted, while the other denied. |

COMMUNICATION DEVICE, COMMUNICATION METHOD, AND NON-TRANSITORY COMPUTER-READABLE STORAGE MEDIUM FOR WIRELESS COMMUNICATION WITH ANOTHER WIRELESS DEVICE UTILIZING A TRAFFICE IDENTIFIER (TID)

CROSS-REFERENCE TO RELATED APPLICATIONS

This application is a Continuation of International Patent Application No. PCT/JP2022/033060, filed Sep. 2, 2022, which claims the benefit of Japanese Patent Application No. 2021-148822, filed Sep. 13, 2021, both of which are hereby incorporated by reference herein in their entireties.

TECHNICAL FIELD

The present invention relates to a communication device, a communication method, and a non-transitory computer-readable storage medium storing a program for performing wireless communication.

BACKGROUND ART

In recent years, wireless communication technologies such as a wireless LAN (Local Area Network) have been developed. As a major wireless LAN communication standard, the IEEE (Institute of Electrical and Electronics Engineers) 802.11 standard series is known. The IEEE 802.11 standard series includes standards such as IEEE 802.11a/b/g/n/ac/ax. For example, the latest standard IEEE 802.11ax uses OFDMA (Orthogonal Frequency Division Multiple Access) to standardize technologies for improving communication speed under congested conditions in addition to high peak throughput of up to 9.6 gigabits per second (Gbps) (see PTL 1). Note that OFDMA stands for Orthogonal frequency-division multiple access.

As a successor standard aimed at further improving throughput, improving frequency utilization efficiency, and improving communication latency, a task group called IEEE 802.11be has been launched.

In IEEE 802.11be, Multi-Link communication has been considered, in which one AP establishes multiple links with one STA (Station) in frequency bands such as 2.4 GHz, 5 GHz, and 6 GHz bands, and performs simultaneous communication.

CITATION LIST

Patent Literature

PTL 1 Japanese Patent Laid-Open No. 2018-50133

In Multi-Link communication considered to be introduced in IEEE 802.11be, it has been considered to associate (assign) a link to be established with a TID, which is an identifier indicating the priority of data. By assigning in advance a TID to a link, it is possible to appropriately select which link to use to communicate data according to the priority of the data.

TID assignments are done by one communication device (Non-AP MLD) requesting the assignments to another communication device (AP MLD), and the requested communication device accepting them. For example, it is assumed that there are three types of TIDs “0”, “1”, and “2”, and four links “1” to “4”. In this case, suppose that the Non-AP MLD has requested to assign the link “1” to the TID “0”, the link “2” to the TID “1”, and the links “3” and “4” to the TID “2”. In this situation, if the AP MLD accepts all of these, the assignments are determined as desired by the Non-AP MLD. In contrast, if the AP MLD does not accept all (if it rejects all), the AP MLD may notify the Non-AP MLD of an alternative to the assignments.

However, there is no conventional procedure that assumes cases in which part of the TID assignments (TID “0” in the above example) requested by the Non-AP MLD is accepted, and the rest (TIDs “1” and “2” in the above example) are unaccepted. Therefore, although part of the requested assignments is acceptable, because there are other unacceptable assignments, the AP MLD will have no choice but to reject all the requests. In this case, the TID assignment process must be done from the beginning again, and there is an issue that the procedure becomes redundant and inefficient.

SUMMARY OF INVENTION

Accordingly, it is an object of the present invention to make the assignment process efficient by introducing a procedure for cases in which only part of the requested TID and link assignments is accepted.

In order to solve the above-mentioned problem, a communication device of the present invention is a communication device capable of establishing a plurality of links in parallel with another communication device, the communication device including: a receiving unit configured to receive a request for a TID (Traffic identifier) and link assignment, the TID indicating a priority of data; and a transmitting unit configured to transmit a response to the request received by the receiving unit, wherein, in a case where a first request is accepted and a second request is unaccepted among requests received by the receiving unit, the transmitting unit transmits a response indicating that the first request is accepted and the second request is unaccepted.

Moreover, a communication device of the present invention is a communication device capable of establishing a plurality of links in parallel with another communication device, the communication device including: a transmitting unit configured to transmit a request for a TID (Traffic identifier) and link assignment, the TID indicating a priority of data; and a receiving unit configured to receive a response to the request transmitted by the transmitting unit, wherein, in a case where a first request is accepted and a second request is unaccepted among requests transmitted by the transmitting unit, the receiving unit receives a response indicating that the first request is accepted and the second request is unaccepted.

Further features of the present invention will become apparent from the following description of exemplary embodiments with reference to the attached drawings.

BRIEF DESCRIPTION OF DRAWINGS

FIG. 13A is a diagram illustrating a list of Status Codes used in the frame format according to the present invention.

FIG. 13B is a diagram illustrating a list of Status Codes used in the frame format according to the present invention.

DESCRIPTION OF EMBODIMENTS

Hereinafter, an embodiment of the present invention will be described in detail with reference to the accompanying drawings. Note that configurations discussed in the following embodiment are merely examples, and the present invention is not limited to the illustrated configurations.

Configuration of Wireless Communication System

Figure 1:
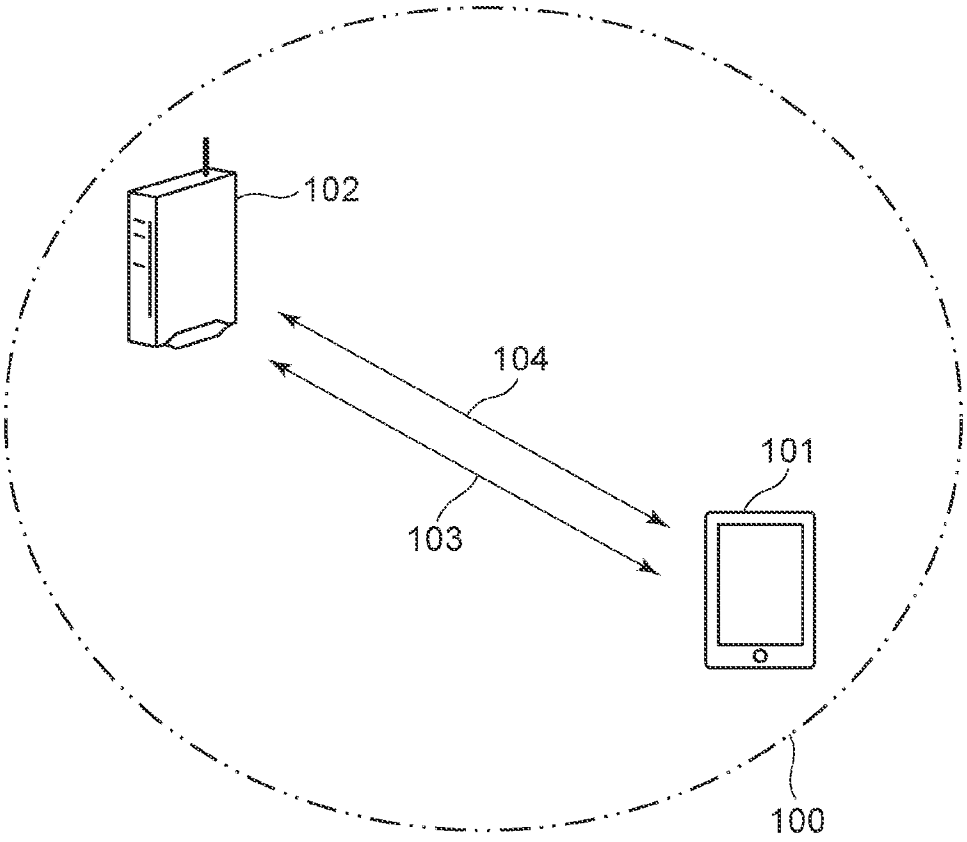
FIG. 1 is a diagram illustrating the overall configuration of a network according to the present invention.

FIG. 1 illustrates the configuration of a network in which a communication device 101 (hereinafter referred to as a Non-AP MLD 101) according to the present embodiment participates. A communication device 102 (hereinafter referred to as an AP MLD 102) is an access point (AP) having the role of building a wireless network 100. The AP MLD 102 is capable of communicating with the Non-AP MLD 101. The present embodiment is applied to each of the Non-AP MLD 101 and the AP MLD 102.

Each of the Non-AP MLD 101 and the AP MLD 102 is capable of executing wireless communication in accordance with the IEEE 802.11be (EHT) standard. Note that IEEE stands for the Institute of Electrical and Electronics Engineers. The Non-AP MLD 101 and the AP MLD 102 are capable of performing communication at frequencies in the 2.4 GHz band, 5 GHz band, and 6 GHz band. The frequency bands used by each communication device are not limited to the above, and, for example, it is permissible to use the 60 GHz band. The Non-AP MLD 101 and the AP MLD 102 can also perform communication using the bandwidths of 20 MHz, 40 MHz, 80 MHz, 160 MHz, and 320 MHz. The bandwidths used by each communication device are not limited to the above, and, for example, it is permissible to use bandwidths such as 240 MHz and 4 MHz.

The Non-AP MLD 101 and the AP MLD 102 can implement multi-user (MU, Multi User) communication that multiplexes signals of multiple users by executing OFDMA communication in accordance with the IEEE 802.11be standard. OFDMA stands for Orthogonal Frequency Division Multiple Access. In OFDMA communication, divided frequency band portions (RUs, Resource Units) are allocated to the individual STAs (Stations) in such a way that they do not overlap, and the carriers of each STA travel straight. Therefore, the AP can communicate concurrently with multiple STAs within the specified bandwidth.

Generally, radio waves have different ranges of coverage depending on their frequencies, and it is known that lower frequencies have greater diffraction of radio waves, allowing them to travel farther, while higher frequencies have less diffraction of radio waves, limiting them to travel shorter distances. Even if there is an obstacle on the way, radio waves with lower frequencies can diffract around the obstacle and reach it, but radio waves with higher frequencies may have difficulty diffracting around the obstacle due to their high straightness, and, as a result, may not reach it. In the meantime, the 2.4 GHz frequency is often used by other devices, and it is known that microwave ovens emit radio waves in the same frequency band. Indeed, it is conceivable that even radio waves emitted by the same device will differ in the strength of the arriving radio waves and the SN (Signal/Noise) ratio, depending on the placement of the device and the surrounding environment.

Note that, although it has been described that the Non-AP MLD 101 and the AP MLD 102 are compatible with the IEEE 802.11be standard, they may be compatible with, in addition thereto, legacy standards that are standards prior to the IEEE 802.11be standard. Specifically, the Non-AP MLD 101 and the AP MLD 102 may be compatible with at least any one of the IEEE 802.11 a/b/g/n/ac/ax standards. Alternatively, the Non-AP MLD 101 and the AP MLD 102 may be compatible with a standard that is the successor to IEEE 802.11be.

In addition, the Non-AP MLD 101 and the AP MLD 102 may also be compatible with other communication standards, such as Bluetooth (registered trademark), NFC, UWB, ZigBee, and MBOA, in addition to the IEEE 802.11 series standards. Note that UWB stands for Ultra Wide Band, and MBOA stands for Multi Band OFDM Alliance. Moreover, NFC stands for Near Field Communication. UWB includes wireless USB, wireless 1394, WiNET, and the like. In addition, the Non-AP MLD 101 and the AP MLD 102 may be compatible with a communication standard for wired communication, such as a wired LAN.

Specific examples of the AP MLD 102 include, but are not limited to, wireless LAN routers, personal computers (PCs), and the like. The AP MLD 102 may also be an information processing device, such as a wireless chip capable of executing wireless communication in accordance with the IEEE 802.11be standard. Also, specific examples of the Non-AP MLD 101 include, but are not limited to, cameras, tablets, smartphones, PCs, mobile phones, video cameras, headsets, printers, and the like. The Non-AP MLD 101 may also be an information processing device, such as a wireless chip capable of executing wireless communication in accordance with the IEEE 802.11be standard.

Furthermore, the Non-AP MLD 101 and the AP MLD 102 establish links over a plurality of frequency channels, and execute Multi-Link communication to communicate. In the IEEE 802.11 series standards, the bandwidth of each frequency channel is defined as 20 MHz. Here, a frequency channel refers to a frequency channel defined in the IEEE 802.11 series standards; and, in the IEEE 802.11 series standards, multiple frequency channels are defined for each frequency band, including the 2.4 GHz band, 5 GHz band, 6 GHz band, and 60 GHz band. Note that, by bonding adjacent frequency channels, it is permissible to utilize a bandwidth of 40 MHz or more within a single frequency channel.

For example, the AP MLD 102 has the ability to establish a link and communicate with the Non-AP MLD 101 over a first frequency channel in the 2.4 GHz band. The Non-AP MLD 101, in parallel with this, has the ability to establish a link and communicate with the AP MLD 102 over a second frequency channel in the 5 GHz band. In this case, the Non-AP MLD 101 executes Multi-Link communication that maintains a second link over the second frequency channel in parallel with a link over the first frequency channel. With the AP MLD 102 establishing links over multiple frequency channels with the Non-AP MLD 101 as above, throughput in communication with the Non-AP MLD 101 can be improved.

Note that, with regard to links between communication devices in Multi-link communication, it is permissible to establish multiple links in different frequency bands. For example, the Non-AP MLD 101 may be able to establish links in the 2.4 GHz band, 5 GHz band, and 6 GHz band. Alternatively, it is permissible to establish links over a plurality of different channels included in the same frequency band. For example, a link of 6 ch in the 2.4 GHz band may be established as a first link, and, in addition to this, a link of 1 ch in the 2.4 GHz band may be established as a second link. Note that links in the same frequency band and links in different frequency bands may coexist. For example, the Non-AP MLD 101 may establish a first link of 6 ch in the 2.4 GHz band, as well as a link of 1 ch in the 2.4 GHz band and a link of 149 ch in the 5 GHz band. By establishing multiple connections at different frequencies between the Non-AP MLD 101 and the AP, even in the case where a particular frequency band is congested, it becomes possible to establish communication with the Non-AP MLD 101 in another frequency band. This can prevent throughput degradation and communication delays in communicating with the Non-AP MLD 101.

Although the wireless network of FIG. 1 has one AP MLD and one Non-AP MLD, the number and arrangement of AP MLD and Non-AP MLD are not limited thereto. For example, in addition to the wireless network of FIG. 1, one more Non-AP MLD may be added. At this time, there are no specific requirements for the frequency band of each link to be established, the number of links, and the frequency bandwidth.

In the case of performing Multi-link communication, the AP MLD 102 and the Non-AP MLD 101 transmit and receive data to and from the partner device over a plurality of links.

The AP MLD 102 and the Non-AP MLD 101 may also be able to execute MIMO (Multiple-Input And Multiple-Output) communication. In this case, the AP MLD 102 and the Non-AP MLD 101 have multiple antennas, one sending different signals from the respective antennas using the same frequency channel. The receiving side simultaneously receives all signals arriving from multiple streams using the multiple antennas, and separates and decodes the signals of each stream. By executing MIMO communication in this way, the AP MLD 102 and the Non-AP MLD 101 can communicate more data within the same period of time than they would without executing MIMO communication. The AP MLD 102 and the Non-AP MLD 101 may also execute MIMO communication on some links when performing Multi-link communication.

Figure 2:
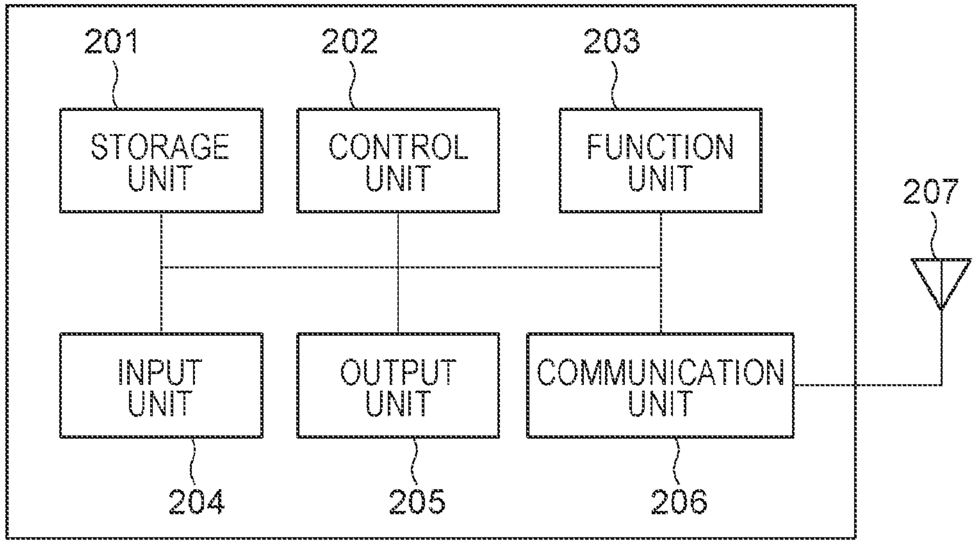
FIG. 2 is a diagram illustrating the hardware configuration of a communication device according to the present invention.

FIG. 2 illustrates an example of the hardware configuration of the Non-AP MLD 101 in the present embodiment. The Non-AP MLD 101 has a storage unit 201, a control unit 202, a function unit 203, an input unit 204, an output unit 205, a communication unit 206, and an antenna 207. Note that multiple antennas may be used.

The storage unit 201 is composed of one or more memories such as ROM and RAM, and stores various information such as a computer program for performing various operations described later, communication parameters for wireless communication, and the like. ROM stands for Read Only Memory, and RAM stands for Random Access Memory. As the storage unit 201, in addition to memory such as ROM and RAM, storage media such as flexible disks, hard disks, optical disks, magneto-optical disks, CD-ROMs, CD-Rs, magnetic tapes, non-volatile memory cards, and DVDs may be used. In addition, the storage unit 201 may include a plurality of memories and the like.

The control unit 202 is composed of one or more processors such as a CPU or MPU, and controls the entirety of the Non-AP MLD 101 by executing the computer program stored in the storage unit 201. Note that the control unit 202 may control the entirety of the Non-AP MLD 101 through cooperation between the computer program stored in the storage unit 201 and the OS (Operating System). The control unit 202 also generates data and signals (wireless frames) to be transmitted in communication with other communication devices. Note that CPU stands for Central Processing Unit, and MPU stands for Micro Processing Unit. In addition, the control unit 202 may also include a plurality of processors such as a multi-core, and control the entirety of the Non-AP MLD 101 using the plurality of processors.

Moreover, the control unit 202 controls the function unit 203 to execute certain processes such as wireless communication, imaging, printing, and projection. The function unit 203 is hardware for the Non-AP MLD 101 to execute certain processes.

The input unit 204 accepts various operations from the user. The output unit 205 performs various outputs to the user through a monitor screen or a loudspeaker. Here, outputs by the output unit 205 may be displaying on a monitor screen, audio outputs by a loudspeaker, vibration outputs, and the like. Note that both the input unit 204 and the output unit 205 may be implemented in a single module, as in a touchscreen. In addition, the input unit 204 and the output unit 205 may each be integrated with or separate from the Non-AP MLD 101.

The communication unit 206 controls wireless communication in accordance with the IEEE 802.11be standard. In addition to the IEEE 802.11be standard, the communication unit 206 may control wireless communication in accordance with other IEEE 802.11 series standards, or control wired communication such as a wired LAN. The communication unit 206 controls the antenna 207 to transmit and receive signals generated by the control unit 202 for wireless communication.

Note that, if the Non-AP MLD 101 is compatible with standards such as the NFC standard and Bluetooth standard in addition to the IEEE 802.11be standard, the Non-AP MLD 101 may control wireless communication in accordance with these communication standards. In addition, if the Non-AP MLD 101 is capable of executing wireless communication in accordance with a plurality of communication standards, the Non-AP MLD 101 may be configured with communication units and antenna compatible with the respective communication standards. The Non-AP MLD 101 communicates data such as image data, document data, and video data with the AP MLD 102 via the communication unit 206. Note that the antenna 207 may be configured as a separate unit from the communication unit 206 or as a single module together with the communication unit 206.

The antenna 207 is an antenna capable of communicating in the 2.4 GHz, 5 GHz, and 6 GHz bands. Although the Non-AP MLD 101 is assumed to have one antenna in the present embodiment, the Non-AP MLD 101 may have three antennas. Alternatively, the Non-AP MLD 101 may have a different antenna for each frequency band. Moreover, in the case where the Non-AP MLD 101 has multiple antennas, the Non-AP MLD 101 may also have the communication unit 206 corresponding to each antenna.

The AP MLD 102 is assumed to have a hardware configuration that is the same as or similar to, but not limited to, the Non-AP MLD 101. For example, the configuration of the input unit 204 and the output unit 205 may differ between the AP MLD 102 and the Non-AP MLD 101.

Figure 3:
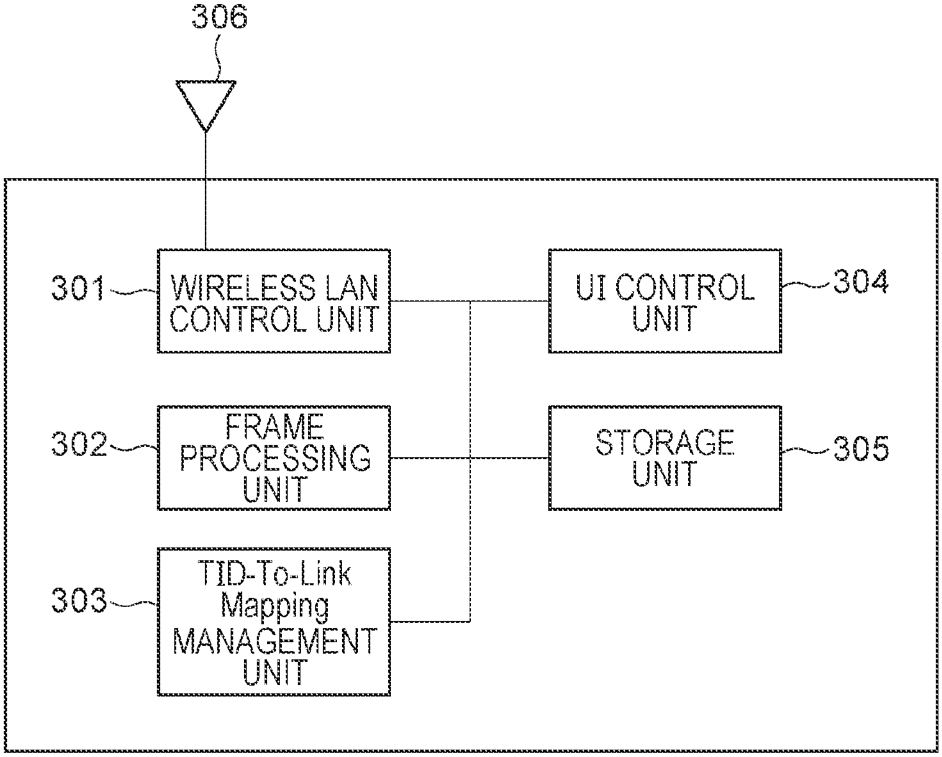
FIG. 3 is a diagram illustrating the functional configuration of the communication device according to the present invention.

FIG. 3 illustrates a block diagram of the functional configuration of the Non-AP MLD 101 in the present embodiment. Note that, although the AP MLD 102 is assumed to have the same or similar configuration, the configuration of the AP MLD 102 may be partially different. Here, it is assumed that the Non-AP MLD 101 includes a wireless LAN control unit 301. Note that the number of wireless LAN control units is not limited to one, and may be two, or may be three or more. The Non-AP MLD 101 further includes a frame processing unit 302, a TID-To-Link Mapping management unit 303, a UI control unit 304, a storage unit 305, and a wireless antenna 306.

The wireless LAN control unit 301 is configured including an antenna and circuitry for transmitting and receiving wireless signals to and from other wireless LAN devices, and a program for controlling them. The wireless LAN control unit 301 executes wireless LAN communication control based on frames generated by the frame processing unit 302 in accordance with the IEEE 802.11 standard series.

The frame processing unit 302 processes wireless control frames transmitted and received by the wireless LAN control unit 301. The content of wireless control generated and analyzed by the frame processing unit 302 may be constrained depending on settings saved in the storage unit 305. In addition, the content may be changed depending on user settings from the UI control unit 304. The generated frame information is sent to the wireless LAN control unit 301, and then sent to the communication partner. The frame information received by the wireless LAN control unit 301 is passed to the frame processing unit 302 to be analyzed.

The TID-To-Link Mapping management unit 303 manages which links have which TIDs associated with them. A TID (Traffic Identifier) is an identifier indicating the priority of data used for QoS purposes, and there are 8 types from “0” to “7”. Among the eight types of TIDs, there are, for example, TIDs for transmitting Video data and Voice data, and each TID must be assigned to at least one link.

The UI control unit 304 is configured including hardware related to a user interface, such as a touchscreen or buttons for accepting operations by the user for the Non-AP MLD 101, and a program for controlling them. Note that the UI control unit 304 also has the function of presenting information to the user, such as displaying an image or an audio output.

The storage unit 305 is a storage device that may be configured by ROM, RAM, etc., which saves programs and data with which the Non-AP MLD 101 operates.

Figure 4:
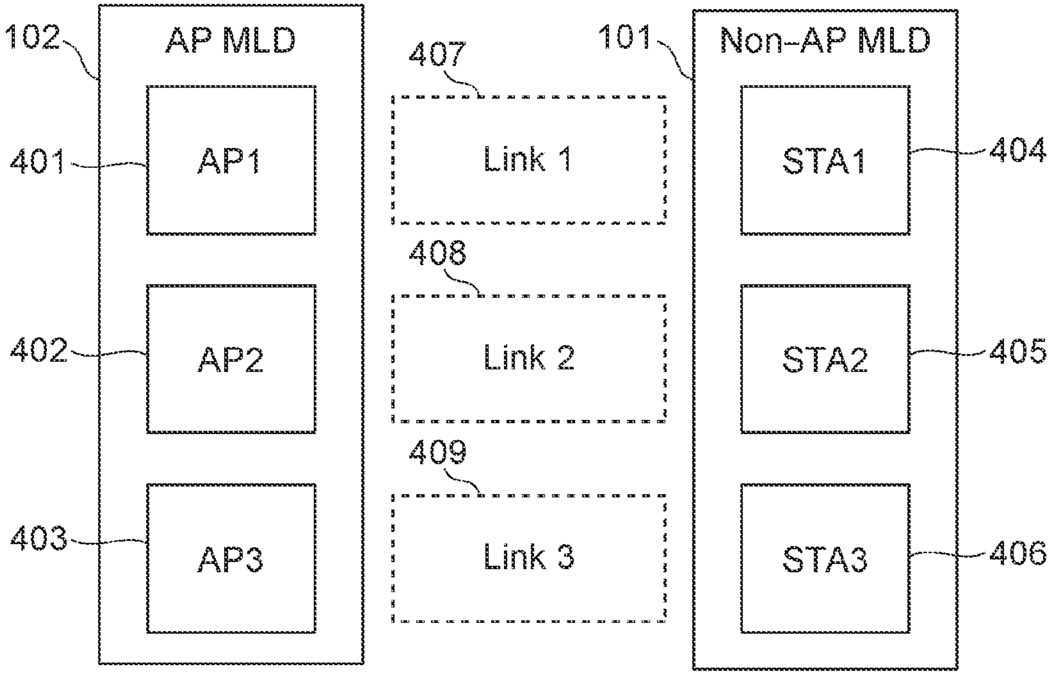
FIG. 4 is a diagram illustrating an overview of Multi-Link communication.

FIG. 4 illustrates an overview of Multi-link communication executed by the AP MLD 102 and the Non-AP MLD 101 in the present embodiment.

A communication device operating on Multi-Link is referred to as an MLD (Multi Link Device), and one MLD has multiple STAs and APs corresponding to respective links. An MLD with the AP function is referred to as an AP MLD, and an MLD without the AP function is referred to as a Non-AP MLD. Note that, even with the AP function, a communication device that does not operate as an AP and participates in a network built by another AP-MLD is also referred to as a Non-AP MLD.

An AP1 401 and a STA1 404 of FIG. 4 establish a Link1 407 over a first frequency channel. Similarly, an AP2 402 and a STA2 405 establish a Link2 408 over a second frequency channel, and an AP3 403 and a STA3 406 establish a Link3 409 over a third frequency channel.

Here, the AP MLD 102 and the Non-AP MLD 101 establish connections over frequency channels in the sub-GHz band, 2.4 GHz band, 3.6 GHz band, 4.9 and 5 GHz bands, 60 GHz band, and 6 GHz band. The AP MLD 102 and the Non-AP MLD 101 maintain, in parallel with a connection of a first link over the first frequency channel, a connection of a second link over the second frequency channel. Also, multiple connections may be established over different frequency channels in the same frequency band, rather than connections in different frequency bands.

Figure 5:
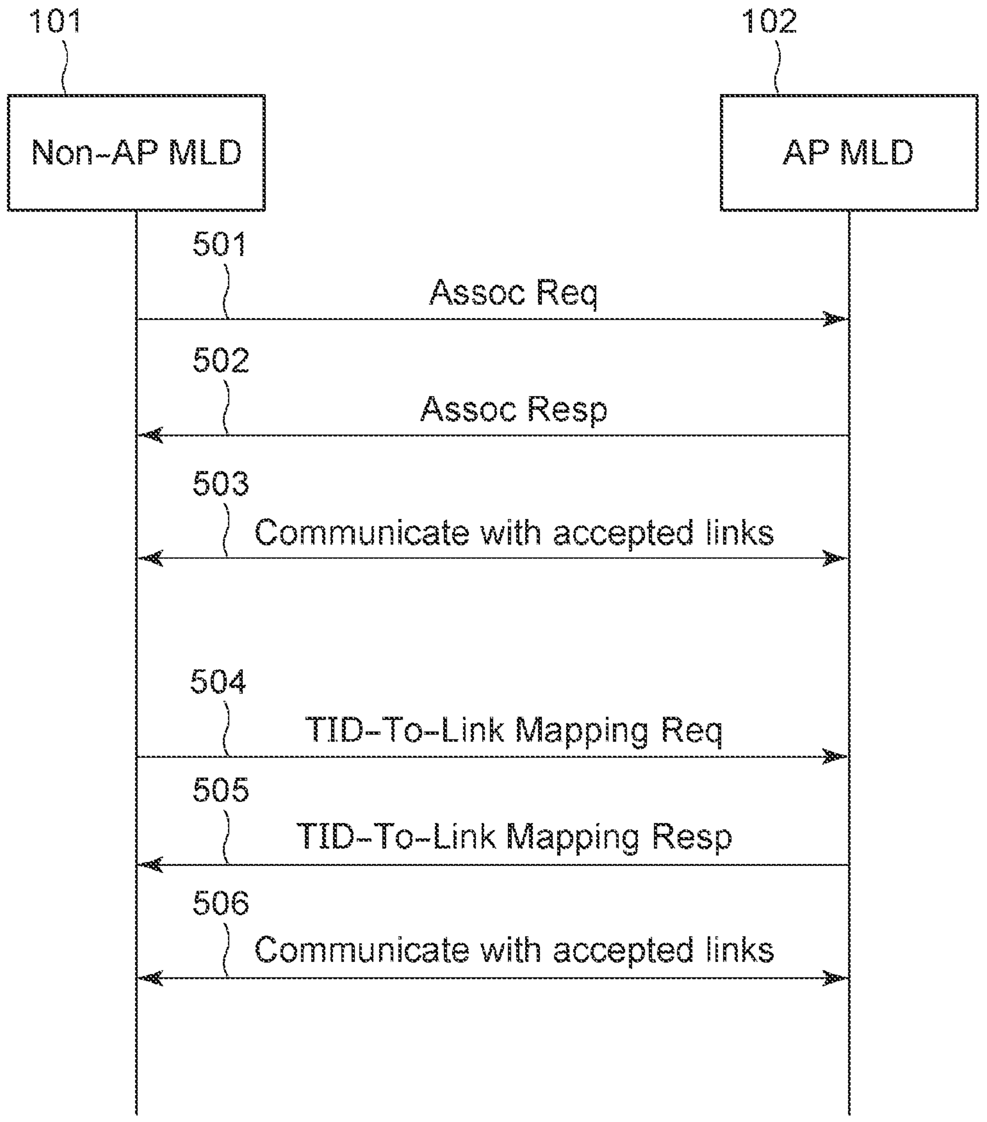
FIG. 5 is a sequence diagram illustrating link establishment according to the present invention.

FIG. 5 is a sequence diagram illustrating link establishment in the present embodiment. The Non-AP MLD 101 transmits an Association Request (501). The Association Request includes a TID-To-Link Mapping element, which will be described later. Having received this, the AP-MLD 102 transmits an Association Response including information indicating whether to accept the requested assignments (502). The Association Response is a response to the Association Request. At this time, if at least part of the assignments is unaccepted, a TID-To-Link Mapping element is included in the Association Response.

Here, if at least part of the assignments is accepted by the AP-MLD 102, communication using that link(s) becomes possible (503).

In contrast, if at least part of the assignments is rejected by the AP-MLD 102, the Non-AP MLD 101 transmits a TID-To-Link Mapping Request (504). The TID-To-Link Mapping Request also includes a TID-To-Link Mapping element. Having received this, the AP-MLD 102 transmits a TID-to-Link Mapping Response including information indicating whether to accept the requested assignments (505). At this time, if at least part of the assignments is unaccepted, a TID-To-Link Mapping element is included in the TID-to-Link Mapping Response.

Here, if at least part of the assignments is accepted by the AP-MLD 102, communication using that link(s) becomes possible (506).

Figure 6:
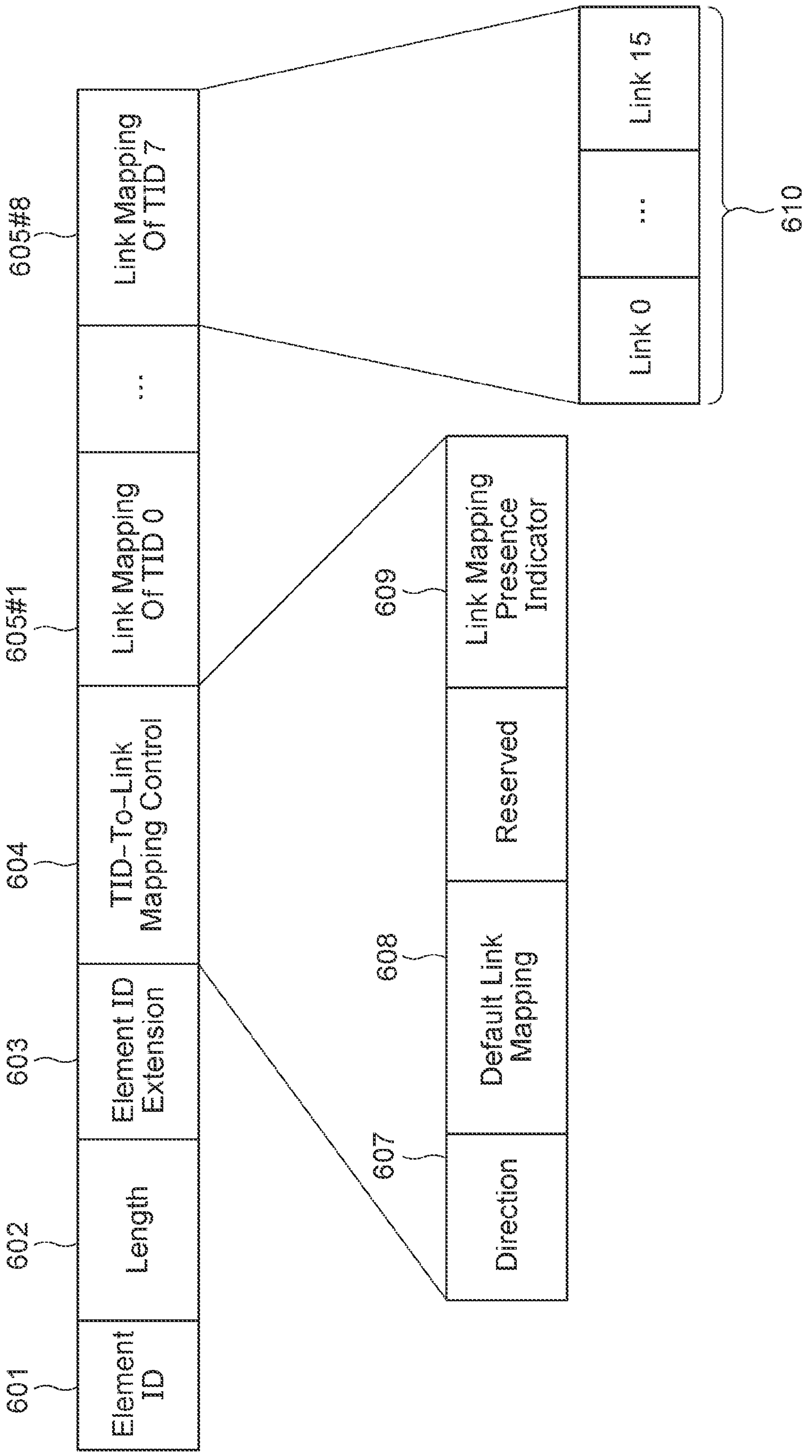
FIG. 6 is a diagram illustrating a frame format according to the present invention.

FIG. 6 illustrate an example of the frame format of a TID-To-Link Mapping element in the present embodiment. Note that, although the name of the Element illustrated in FIG. 6 is TID-To-Link Mapping Element in the present embodiment, this is not the only possible name, and other names may be used. The current element is stored in management frames such as Association Request frames and Association Response frames. The current element is also stored in action frames such as TID-To-Link Mapping Request frames and TID-To-Link Mapping Response frames.

The TID-To-Link Mapping element includes Element ID 601, Length 602, Element ID Extension 603, and TID-To-Link Mapping Control 604. The TID-To-Link Mapping element further includes Link Mapping of TID 605 #1 to #8.

The TID-To-Link Mapping Control 604 includes Direction 607, Default Link Mapping 608, and Link Mapping Presence Indicator 609.

The Direction 607 is a field indicating whether the current element is in the UL direction or the DL direction. The Default Link Mapping 608 is a field indicating that TID assignments are performed in the default mode. Here, the default mode is a mode in which all links are assigned with all TIDs.

The Link Mapping Presence Indicator 609 is a field indicating whether the Link Mapping of TID 605 is included in the current element. If the Link Mapping of TID 605 is not included in the current element, it is permissible not to include the Link Mapping Presence Indicator 609.

The Link Mapping of TID 605 #1 to #8 are each a field indicating to which link each TID is assigned, and are generated as many as the number of TIDs. That is, because there are 8 types of TIDs from "0" to "7" as described above, eight types of Link Mapping of TID 605 #1 to #8 are included.

A more detailed description will be given using the Link Mapping of TID 605 #8. In the Link Mapping of TID 605 #8, a number of bits 610 equal to the number of established links (up to 16) are prepared, and the value of each bit indicates whether each link is assigned to the TID "7". For example, consider a case where the links "1" to "3" are established, and the links to which the TID "7" is assigned are the links "1" and "3". In this case, the Link Mapping of TID 605 #8 stores the values 1, 0, and 1 in the bits corresponding to the links "1" to "3", respectively.

Figure 7:
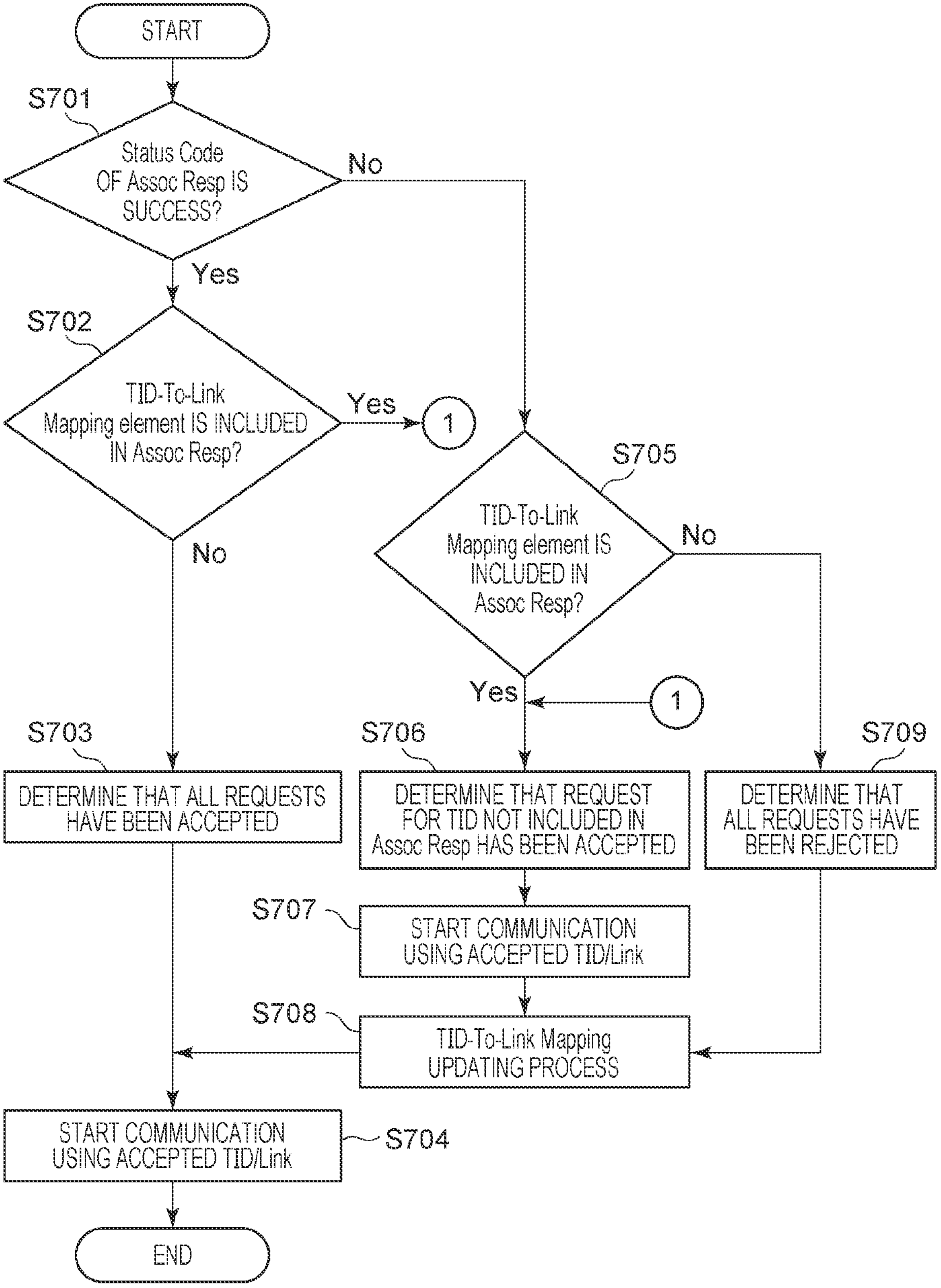
FIG. 7 is a flowchart illustrating the operation of a communication device (Non-AP MLD) according to the present invention.

Using FIG. 7, the flow of a TID and link assignment process, which is implemented by the control unit 202 executing a program stored in the storage unit 201 of a communication device operating as the Non-AP MLD 101, will be described. This flowchart starts after the Non-AP MLD 101 transmits the Association Request described in FIG. 5 at 501, and then receives the Association Response described at 502.

In S701, it is determined whether the status code of the received Association Response is "SUCCESS".

FIGS. 13A and 13B are diagrams illustrating a list of Status Codes. Among them, the Status Code "1" illustrated in FIG. 13A is associated with "SUCCESS". That is, in S701, it is determined whether the Status Code is "1". As a result of the determination, if the Status Code indicates "SUCCESS", the process moves to S702; if not, the process moves to S705. Note that "PREFERRED_TID_TO_LINK_MAPPING_SUGGESTED" or "ACCEPT_PARTIAL_TID_TO_LINK_MAPPING" may be introduced, as will be described later in second and third modifications on the AP-MLD 102 side. In this case, it may be determined whether these Status Codes are indicated before moving to S705. In this case, if none of the Status Codes apply, it may be regarded as an error to terminate the process.

In S702, it is determined whether a TID-To-Link Mapping element is included in the received Association Response. As a result of the determination, if a TID-To-Link Mapping element is included, the process moves to S706; if not, the process moves to S703.

In S703, based on the fact that the Status Code is "SUCCESS" and no TID-To-Link Mapping element is included, it is determined that all requests from the Non-AP MLD 101 have been accepted. Subsequently, in S704, communication is started based on the accepted assignments.

In contrast, in S705, as in S702, it is determined whether a TID-To-Link Mapping element is included in the received Association Response. As a result of the determination, if a TID-To Link Mapping element is included, the process moves to S706; if not, the process moves to S709.

In S709, based on the fact that the Status Code is not "SUCCESS" and no TID-To-Link Mapping element is included, it is determined that all requests from the Non-AP MLD 101 have been rejected. Subsequently, in S708, a TID-To-Link Mapping updating process is performed. Details of this process will be described later using FIG. 8.

In contrast, in S706, it is determined whether the requested assignments have been accepted based on the TID-To-Link Mapping element included in the Association Response. Here, if there is even one Link Mapping of TID 605 that is not included in the received TID-To-Link Mapping element, it is determined that, for the corresponding TID, the requested assignment has been accepted. In this case, subsequently in S707, communication is started based on the accepted assignment. In contrast, for a TID of which a corresponding Link Mapping of TID 605 is included in the received TID-To-Link Mapping element, it is determined that the requested assignment has been rejected. For such a TID, a TID-To-Link Mapping updating process is performed in S708.

Figure 8:
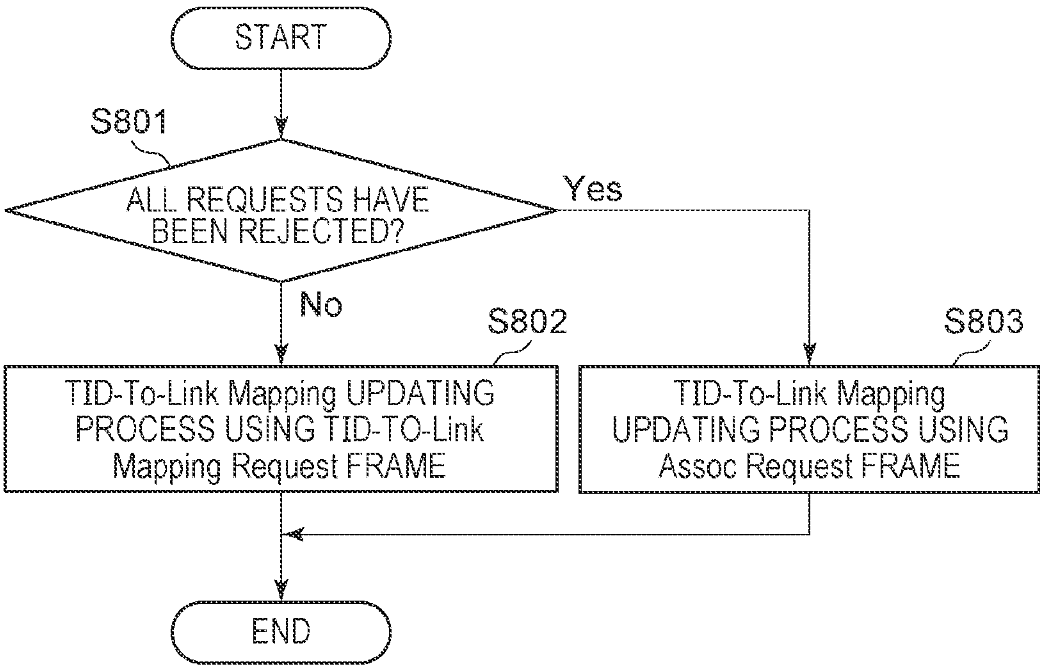
FIG. 8 is a flowchart illustrating the operation of the communication device (Non-AP MLD) according to the present invention.

Using FIG. 8, S708 will be described in detail. In S801, it is determined whether all requests have been rejected. All requests are rejected when the process transitions from S709 to S708. Also applicable is the case where, in the determination of S706, there is no Link Mapping of TID 605 that is not included in the TID-To-Link Mapping element. This is the case when the Link Mapping of TID 605 for all TIDs is included. As a result of the determination, if all requests are rejected, the process moves to S803; if not, the process moves to S802.

In S802 and S803, a process of re-requesting the rejected part or all of the assignments is performed. Note that, although the process is performed using a TID-to-Link Mapping Request in S802, the process is performed using an Association Request in S803. The difference comes from the fact that, when all requests are rejected, it is necessary to restart the process from the Association procedure, whereas, if some requests are accepted, it is only necessary to update the TID-to-Link Mapping.

Using FIG. 9, the flow of a TID and link assignment process, which is implemented by the control unit 202 executing a program stored in the storage unit 201 of a communication device operating as the AP MLD 102, will be described. This flowchart starts when the AP MLD 102 receives the Association Request described in FIG. 5 at 501.

In S901, it is determined whether it is possible to accept all of the assignments requested from the Non-AP MLD 101. As a result of the determination, if it is possible to accept all, the process moves to S902; if not (that is, if there is any part of the assignments that is unaccepted), the process moves to S904.

In S902, an Association Response including no TID-To-Link Mapping element is transmitted to the Non-AP MLD 101. At this time, "1", meaning "SUCCESS", is set to the Status Code of the Association Response.

In contrast, in S904, a TID-To-Link Mapping element including the Link Mapping of TID 605 corresponding to an unaccepted TID is generated. Then, an Association Response including this TID-To-Link Mapping element is transmitted. At this time, "1", meaning "SUCCESS", is set to the Status Code of the Association Response.

Subsequently, in S903, communication of each link is started based on the accepted TID assignment(s). Note that, if all of the requested assignments are rejected, no communication is started in S903.

First Modification

Figure 9:
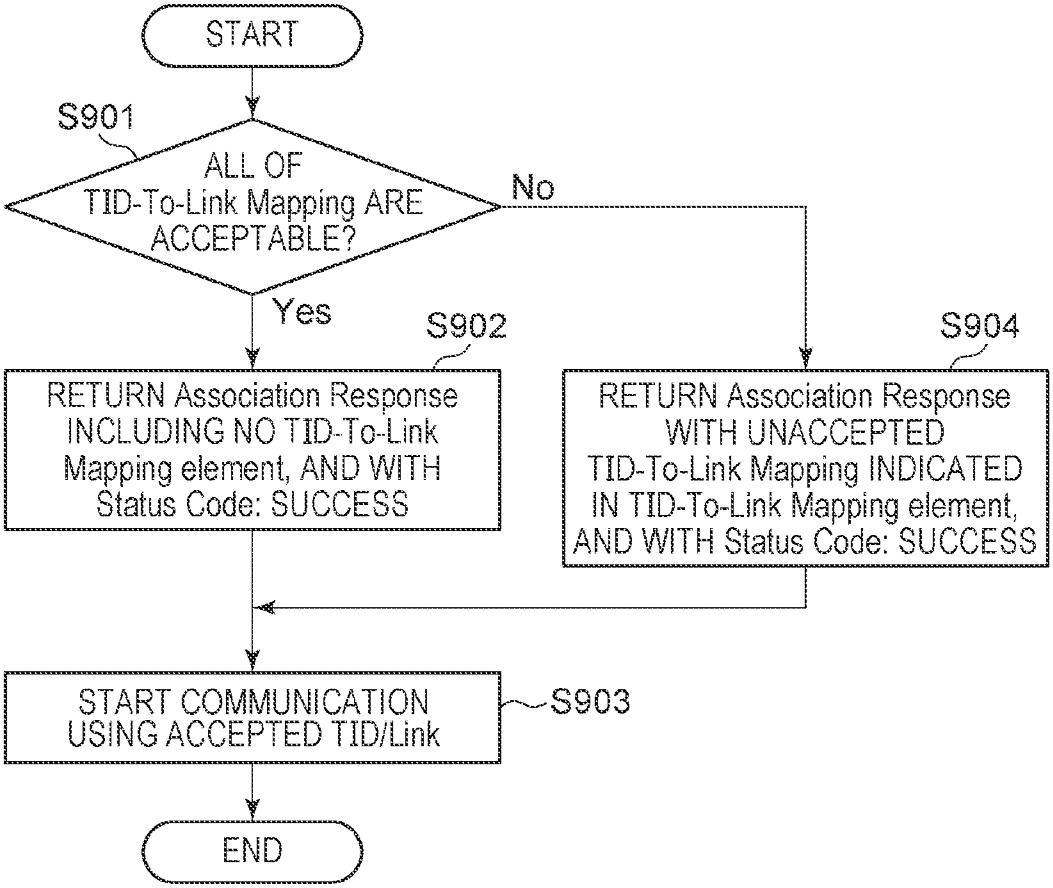
FIG. 9 is a flowchart illustrating the operation of a communication device (AP MLD) according to the present invention.
Figure 10:
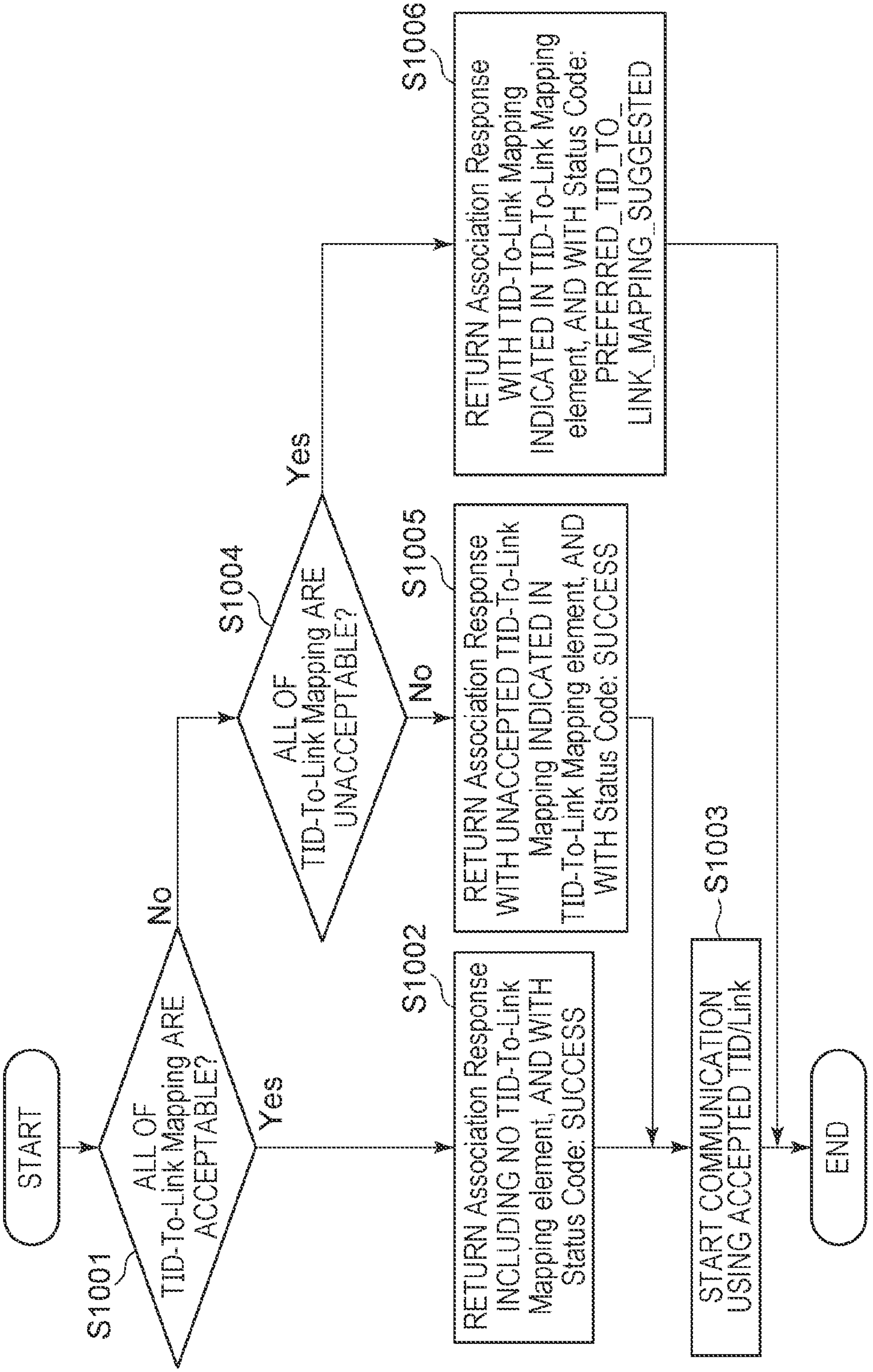
FIG. 10 is a flowchart illustrating the operation of the communication device (AP MLD) according to the present invention.

FIG. 10 describes the flow of a TID and link assignment process, which is implemented by the control unit 202 executing a program stored in the storage unit 201 of a communication device operating as the AP MLD 102, and is a modification of FIG. 9. Since S1001 to S1003 are the same as the processing of S901 to S903 in FIG. 9, descriptions thereof will be omitted.

In S1004, it is determined whether all of the requested assignments are unacceptable. As a result of the determination, if all of the requested assignments are unacceptable, the process moves to S1006; if not, the process moves to S1005.

In S1005, a TID-To-Link Mapping element including the Link Mapping of TID 605 corresponding to an unaccepted TID is generated. Then, an Association Response including this TID-To-Link Mapping element is transmitted to the Non-AP MLD 101. At this time, "1", meaning "SUCCESS", is set to the Status Code of the Association Response.

In S1006, a TID-To-Link Mapping element including the Link Mapping of TID 605 corresponding to all TIDs is generated. Then, an Association Response including this TID-To-Link Mapping element is transmitted. At this time, "22", meaning "PREFERRED_TID_TO_LINK_MAPPING_SUGGESTED", is set to the Status Code of the Association Response.

Here, the reason for making the Status Code different between S1005 and S1006 is to enable the Non-AP MLD side to easily distinguish whether some requests have been accepted or all requests have been rejected. In the example of FIG. 7, although all cases except for the case where the Status Code is "1" are processed in the same or similar manner, it is permissible to make the processing different between the case of "PREFERRED_TID_TO_LINK_MAPPING_SUGGESTED" and other cases.

Second Modification

Figure 11:
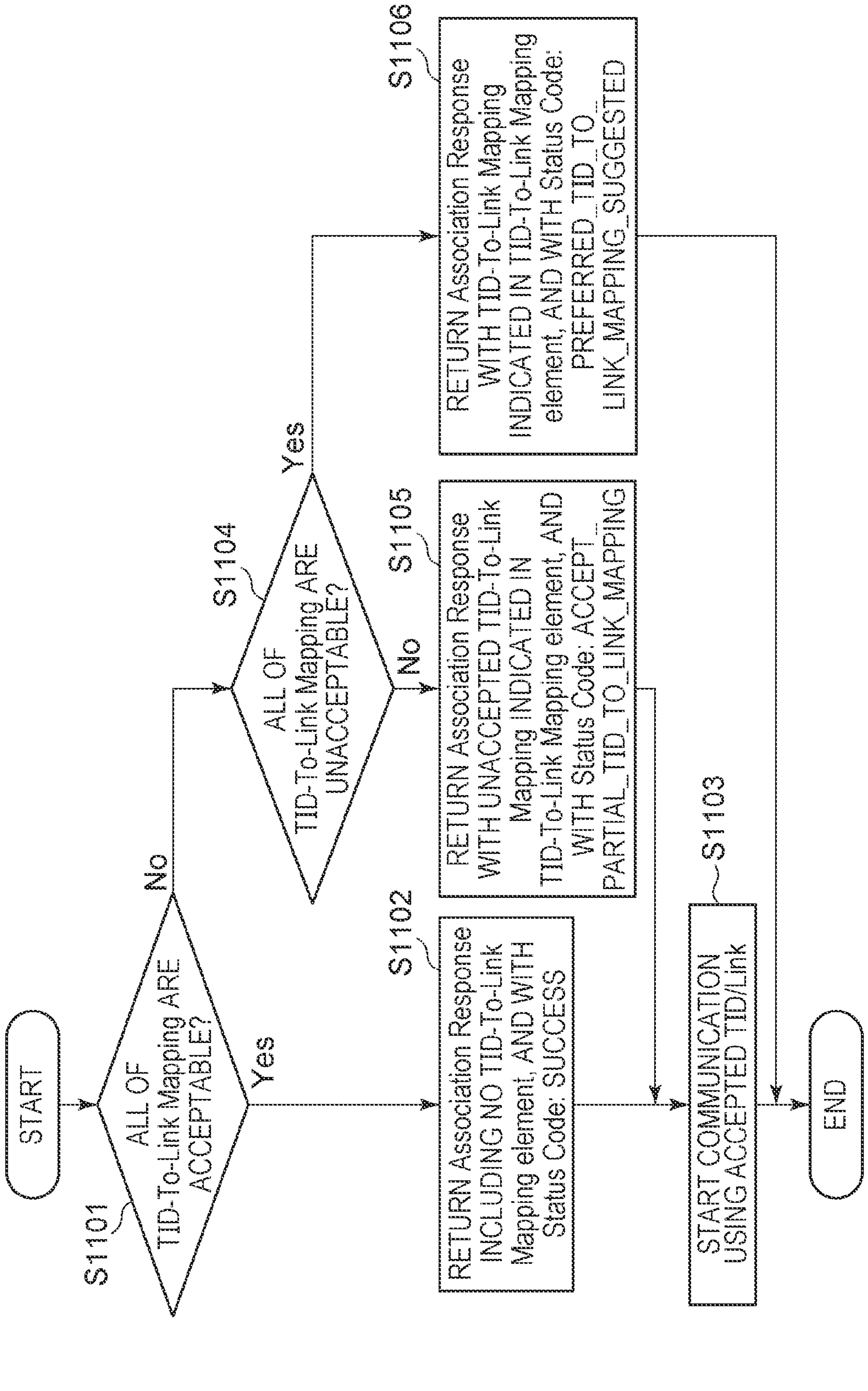
FIG. 11 is a flowchart illustrating the operation of the communication device (AP MLD) according to the present invention.

FIG. 11 describes the flow of a TID and link assignment process, which is implemented by the control unit 202 executing a program stored in the storage unit 201 of a communication device operating as the AP MLD 102, and is a further modification of FIG. 9. Comparing FIGS. 10 and 11, the processing of S1005 has been changed to S1105; apart from this, the same processing is executed in the corresponding steps.

In S1105, a TID-To-Link Mapping element including the Link Mapping of TID 605 corresponding to an unaccepted TID is generated. Then, an Association Response including this TID-To-Link Mapping element is transmitted to the Non-AP MLD 101. At this time, "23", meaning "ACCEPT_PARTIAL_TID_TO_LINK_MAPPING", is set to the Status Code of the Association Response.

Here, the reason for making the Status Code different between S1102 and S1105 is to enable the Non-AP MLD side to easily distinguish whether some requests have been rejected or all requests have been accepted.

Specific Example of Assignment Process

Figure 12:
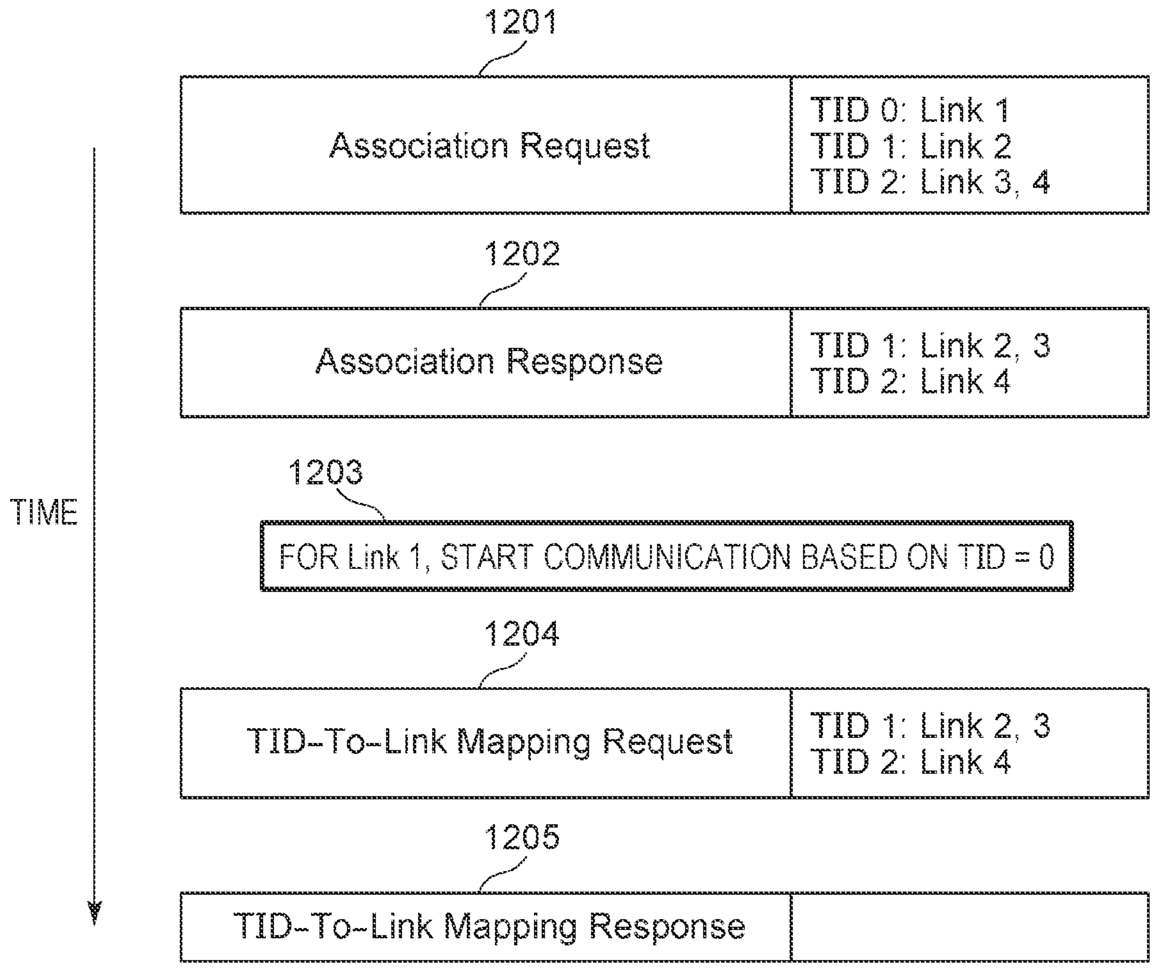
FIG. 12 is a diagram illustrating an example of a procedure for assigning TIDs and links.

FIG. 12 is a diagram illustrating a specific example of a TID and link assignment process. For example, it is assumed that there are three types of TIDs "0", "1", and "2", and four links "1" to "4". In this case, the Non-AP MLD 101 requests that the link "1" be assigned to the TID "0", the link "2" to the TID "1", and the links "3" and "4" to the TID "2" (1201). However, the AP-MLD 102 accepts the request for the TID "0", but rejects the requests for the TIDs "1" and "2". At this time, the Association Response transmitted by the AP-MLD 102 includes a TID-To-Link Mapping element including the Link Mapping of TID 605 corresponding to the TIDs "1" and "2". In contrast, the Link Mapping of TID 605 corresponding to the TID "0" is not included (1202).

Having received this Association Response, the Non-AP MLD 101 determines that the request for the TID "0" has been accepted, and starts communication using the link "1" based on TID=0. Note that, since the TID assignments for the links "2" to "4" have not been accepted, no communication is started (1203).

Then, if the Non-AP MLD 101 agrees to the assignments proposed from the AP-MLD 102, the Non-AP MLD 101 generates a TID-To-Link Mapping element including the corresponding Link Mapping of TID 605. Then, a TID-To-Link Mapping Request including this TID-To-Link Mapping element is transmitted (1204).

The AP-MLD 102 accepts all of the re-requests from the Non-AP MLD 101. At this time, no TID-To-Link Mapping element is included in the TID-To-Link Mapping Response transmitted by the AP-MLD 102.

Note that, although an example where the Non-AP MLD agrees to all of the assignments proposed from the AP-MLD 102 at 1202 has been described here, it is permissible to request a new assignment at 1204 if the Non-AP MLD disagrees with at least part of the assignments.

Also, although an example where one link is assigned with one TID has been described here, it is permissible to assign one link with multiple TIDs.

Note that an example where requests are accepted or rejected in units of TIDs has been described in the above-described embodiment, the present embodiment is not limited thereto. That is, if a request is made to assign multiple links with the same TID, it is permissible to accept some links and reject the other links. In this case, in the determination of S702 and S705, instead of determining whether a TID-To-Link Mapping element is included, a determination is made as to whether there is an accepted link. This determination is made by referring to the bits 610 in the Link Mapping of TID 605 #8. In this case, in S707, even when links are assigned with the same TID, communication is started using an accepted link, but no communication is started using a rejected link.

Other Embodiments

Note that a storage medium having recorded thereon the program code of software that implements the above-described functions may be supplied to a system or device, and a computer (CPU or MPU) of the system or device may read and execute the program code stored in the storage medium. In this case, the program code read out from the storage medium itself will implement the functions of the above-described embodiment, and a storage medium storing the program code will constitute the above-described device.

As the storage medium for supplying the program code, for example, flexible disks, hard disks, optical disks, magneto-optical disks, CD-ROMs, CD-Rs, magnetic tapes, non-volatile memory cards, ROMs, DVDs, and the like can be used.

In addition to the above-mentioned functions being implemented by the computer executing the read-out program code, the OS running on the computer may also perform part or all of the actual processing based on the instructions of the program code to implement the above-mentioned functions. OS stands for Operating System.

Furthermore, the program code read out from the storage medium is written into a memory provided in a function expansion board inserted into the computer or a function expansion unit connected to the computer. Then, based on the instructions of the program code, a CPU provided in the function expansion board or the function expansion unit may perform part or all of the actual processing to implement the above-described functions.

The present invention can also be implemented by a process of supplying a program that implements one or more functions of the above-described embodiment to a system or device via a network or storage medium, and one or more processors in a computer of the system or device reads and executes the program. The present invention can also be implemented by circuitry (e.g., ASIC) that implements one or more functions.

The present invention is not limited to the above-described embodiment, and various changes and modifications can be made without departing from the spirit and scope of the present invention. Accordingly, the following claims are attached to make the scope of the present invention public.

According to the present invention, the assignment process can be performed efficiently by introducing a procedure for cases in which only part of the requested TID and link assignments is accepted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device capable of establishing a plurality of links with another communication device, the communication device comprising:

at least one memory that stores a set of instructions; and at least one processor that executes the instructions, the instructions, when executed, causing the communication device to perform operations comprising:

receiving an Association Request frame including a TID-To-Link Mapping element indicating a request for a TID (Traffic identifier) and link assignment, the TID indicating a priority of data; and transmitting an Association Response frame including a TID-To-Link Mapping element corresponding to the Association Request frame;

wherein the Association Response frame indicates that, among requests included in the Association Request frame, a first request is accepted and a second request is unaccepted, wherein the Association Response frame includes a status code indicating success, and a link is established between the communication device and the other communication device by communicating the Association Response frame, and communicating a TID-to-Link Mapping Request frame and a TID-to-Link Mapping Response frame to perform re-negotiation of TID-to-Link Mapping after establishment of a link based on the Association Response frame.

2. The communication device according to claim 1, wherein, in a case where the first request is accepted and the second request is unaccepted among requests included in the Association Request frame the Association Response frame includes information related to a TID and link assignment corresponding to the second request.

3. The communication device according to claim 1, wherein the re-negotiation using the TID-to-Link Mapping Request frame and the TID-to-Link Mapping Response frame is performed for a request that is unaccepted in negotiation using the Association Request frame and the Association Response frame.

4. The communication device according to claim 1, wherein the status code indicating success is included in the TID-to-Link Mapping element.

5. The communication device according to claim 1, wherein the Association Response frame does not include information related to a TID-to-Link Mapping that is accepted in the negotiation using the Association Request frame and the Association Response frame.

6. The communication device according to claim 1, wherein, in a case where both the first request and the second request are unaccepted, the Association Response frame includes a status code indicating a result other than success.

7. The communication device according to claim 1, wherein, after a link is established by the Association Request frame and the Association Response frame, communication based on a TID-to-Link Mapping that is accepted in the negotiation using the Association Request frame and the Association Response frame is performed before the re-negotiation using the TID-to-Link Mapping Request frame and the TID-to-Link Mapping Response frame.

8. A communication device capable of establishing a plurality of links with another communication device, the communication device comprising:

at least one memory that stores a set of instructions; and at least one processor that executes the instructions, the instructions, when executed, causing the communication device to perform operations comprising:

transmitting an Association Request frame including a TID-To-Link Mapping element indicating a request for a TID (Traffic identifier) and link assignment, the TID indicating a priority of data; and receiving an Association Response frame including a TID-To-Link Mapping element corresponding to the Association Request frame, wherein the Association Response frame indicates that, among requests included in the Association Request frame, a first request is accepted and a second request is unaccepted, wherein the Association Response frame includes a status code indicating success, and a link is established between the communication device and the other communication device by communicating the Association Response frame, and communicating a TID-to-Link Mapping Request frame and a TID-to-Link Mapping Response frame to perform re-negotiation of TID-to-Link Mapping after establishment of a link based on the Association Response frame.

9. The communication device according to claim 8, wherein the re-negotiation using the TID-to-Link Mapping Request frame and the TID-to-Link Mapping Response frame is performed for a request that is unaccepted in negotiation using the Association Request frame and the Association Response frame.

10. The communication device according to claim 8, wherein the status code indicating success is included in the TID-to-Link Mapping element.

11. The communication device according to claim 8, wherein the Association Response frame does not include information related to a TID-to-Link Mapping that is accepted in the negotiation using the Association Request frame and the Association Response frame.

12. The communication device according to claim 8, wherein, in a case where both the first request and the second request are unaccepted, the Association Response frame includes a status code indicating a result other than success.

13. The communication device according to claim 8, wherein, after a link is established by the Association Request frame and the Association Response frame, communication based on a TID-to-Link Mapping that is accepted in the negotiation using the Association Request frame and the Association Response frame is performed before the re-negotiation using the TID-to-Link Mapping Request frame and the TID-to-Link Mapping Response frame.

14. A communication method for a communication device capable of establishing a plurality of links with another communication device, the method comprising:

receiving an Association Request frame including a TID-To-Link Mapping element indicating a request for a TID (Traffic identifier) and link assignment, the TID indicating a priority of data; and transmitting an Association Response frame including a TID-To-Link Mapping element corresponding to the Association Request frame, wherein the Association Response frame indicates that, among requests included in the Association Request frame, a first request is accepted and a second request is unaccepted, wherein the Association Response frame includes a status code indicating success, and a link is established between the communication device and the other communication device by communicating the Association Response frame, and communicating a TID-to-Link Mapping Request frame and a TID-to-Link Mapping Response frame to perform re-negotiation of TID-to-Link Mapping after establishment of a link based on the Association Response frame.

15. A communication method for a communication device capable of establishing a plurality of links with another communication device, the method comprising:

transmitting an Association Request frame including a TID-To-Link Mapping element indicating a request for a TID (Traffic identifier) and link assignment, the TID indicating a priority of data; and receiving an Association Response frame including a TID-To-Link Mapping element corresponding to the Association Request frame, wherein the Association Response frame indicates that, among requests included in the Association Request frame, a first request is accepted and a second request is unaccepted, wherein the Association Response frame includes a status code indicating success, and a link is established between the communication device and the other communication device by communicating the Association Response frame, and communicating a TID-to-Link Mapping Request frame and a TID-to-Link Mapping Response frame to perform re-negotiation of TID-to-Link Mapping after establishment of a link based on the Association Response frame.

* * * * *